United States Patent Office 3,493,382
Patented Feb. 3, 1970

3,493,382
METHOD OF PRODUCING A MOLDED,
EDIBLE PRODUCT
John W. Ryan, Los Angeles, Edwin O. Stastny, Santa
Ana, and Edgar Burns, Los Angeles, Calif., assignors
to Mattel, Inc., Hawthorne, Calif., a corporation of
California
No Drawing. Filed Jan. 13, 1967, Ser. No. 608,975
Int. Cl. A23l 1/04
U.S. Cl. 99—1
9 Claims

ABSTRACT OF THE DISCLOSURE

A molded, edible product is produced by filling a mold with a liquid edible mixture of glycerine and/or propylene glycol, carrageenan and tapioca starch, and thereafter heating the mold until the mixture solidifies.

---

The liquid, edible products employed in the method of the present invention are disclosed in copending application Ser. No. 608,998 filed Jan. 13, 1967.

A toy finding popular acceptance, comprises a kit containing a heating element, a plurality of molds which may be heated on the heating element and a supply of a liquid, plastic material which may be poured into a mold and solidified by the application of heat. The solidified product comprises a soft, pliable plastic article taking the shape of the mold. It has been found that molds for making plastic bugs, spiders, snakes and the like are popular.

While generally satisfactory, this method of producing molded products and the article produced thereby has the disadvantage that the user of the toy soon accumulates a supply of molded articles and loses his interest in making additional articles because of this accumulated supply.

In view of the foregoing factors and conditions characteristic of a method of producing molded products and the articles produced thereby, it is a primary object of the present invention to provide a new and useful method of producing a molded, edible product and an article produced thereby not subject to the disadvantage enumerated above and being of an edible nature, whereby a child user of the method may consume the product produced thereby.

Another object of the present invention is to provide an edible product which a child user may readily make by following the steps of the method of the present invention.

A further object of the present invention is to provide a new and useful molded, edible product which may be made by the steps of filling a mold with a liquid, edible product, heating the mold to a temperature such that the product changes from a liquid to a solid and removing the solid product from the mold.

According to the present invention, a molded, edible product is produced by adding an artificial sweetener, which may comprise sodium cyclamate and potassium citrate to glycerine to form a mixture. The mixture is then heated to approximately 170° F. to dissolve the sweetener and the potassium citrate. An internal mold release, which may be glycerol-monooleate, propylene glycol, lecithin, coloring agents, flavoring agents and an antioxidant may then be added to the dissolved mixture and the mold-release-containing mixture is cooled to a temperature within the range of 90° F.–100° F. Instead of adding glycerol-monooleate to the heated mixture, the mixture may be cooled, the mold release agent added and the mixture reheated to a temperature within the range of 90° F.–110° F. Dry binding agents capable of gelling the glycerine and of solidifying the mixture at a temperature within the range of 195° F.–220° F. are then added to the cooled mold-release-containing mixture to form a liquid, edible product of a type wherein viscosity increases with temperature. The binding agents may include a first agent, carrageenan, which is capable of gelling the glycerine, and a second binding agent, tapioca starch, which is capable of solidifying the mixture within the aforementioned temperature range of 195° F.–220° F. A suitable product may contain on a weight basis, 0.4% of potassium citrate, 0.4% of sodium cyclamate, 74.2% of glycerine, 0.5% of glycerol-monooleate, 2.5% of carrageenan and 22% of tapioca starch. This edible product is then poured into a mold and heated to a temperature such that the product changes from a liquid to a solid. The solid product is then removed from the mold.

It has been found that heating the liquid product to a temperature within the range of 195° F.–220° F. produces a satisfactory solid product.

Preferably, a mold is employed which has intrinsic lubricity.

The features of the present invention which are believed to be novel are set forth with particularity in the appended claims. The present invention, both as to the method steps employed and the article produced thereby, together with further objects and advantages thereof, may best be understood by reference to the following description.

In producing a liquid, edible product of a type wherein viscosity increases with temperature, glycerine may be employed as the only liquid because of its low toxicity, its germicidal qualities at high concentration and its high boiling point (290° C.). A high boiling point is essential because the temperatures employed in the method of the present invention to increase the viscosity of the liquid, edible product are above the boiling point of water. Thus, if water was used as the liquid, the product would not be faithfully reproduced in the mold and the boiling of the water might create safety problems resulting in injury to a child user of the method of the present invention.

Carrageenan may be employed as a binder to bind some of the glycerine. It has been found that carrageenan will hold about 90% glycerine after about four days. In addition, the carrageenan adds strength to the product to facilitate removing it from the mold. Also, it is a protective factor so it will become a solid at lower temperatures and will not pour out readily from the mold when hot.

Tapioca starch is used because it will solidify at approximately 195° F.–220° F. During the heating in the mold, the carrageenan has a gelling point at about 185° F. Viscosity of the liquid then drops initially because of the glycerine which becomes thinned when heated. As the heat approaches 180° F., the carrageenan is gelling glycerine or imbibing it. The gelled glycerine and carrageenan then become semi-fluid until the temperature reaches approximately 195° F.–220° F. where the starch solidifies. Upon cooling, the carrageenan will re-gel at approximately 180° F. resulting in a solid. The carrageenan gives strength that the starch alone does not have and constitutes a protective factor because it becomes a solid at a lower temperature and will not pour out readily from the mold during the heating operation. If desired, gelling of the glycerine and starch at room temperatures may be minimized by adding propylene glycol to the liquid product. In addition, glycerol-mono-oleate may be used as an internal mold release and lecithin, honey, coloring agents, flavoring agents, artificial sweeteners and anti-oxidants may be used.

EXAMPLE 1

A liquid, edible product of a type wherein viscosity increases with temperature and which gels when heated was poured into a mold plate having an open face.
The mold was heated to a temperature such that the product changed from a liquid to a solid appearing dry and grainy.

The solid product was then removed from the mold.

EXAMPLE 2

A molded, edible product was prepared in accordance with the steps of Example 1 except that the molded product was cooled to a temperature which would not burn the human hand before the product was removed from the mold.

EXAMPLE 3

A product was prepared following the steps of Example 1 except that the product was heated to a temperature within the range of 195° F.–220° F.

EXAMPLE 4

A product was prepared in accordance with steps of Example 1 using a mold made of a stamped aluminum having intrinsic lubricity.

EXAMPLE 5

A product was prepared in accordance with steps of Example 1 using a liquid, edible product having glycerine as the only liquid contained therein. The concentration of the glycerine was such that it imparted germicidal qualities to the liquid product.

EXAMPLE 6

A product was prepared in accordance with the steps of Example 1 using a liquid, edible product having an internal mold release contained therein in the form of glycerol mono-oleate.

EXAMPLE 7

A product was prepared in accordance with the steps of Example 1 including the step of adding a color which was prepared by precipitating an edible food dye on aluminum hydroxide to make a lakolene type dye which is non-bleeding.

EXAMPLE 8

A molded, edible product was produced by the steps of:

(1) Dissolving 5 parts by weight of potassium citrate and 1 part by weight of an artificial sweetener comprising a 10 to 1 mixture of sodium cyclamate and sodium saccharin in 225 parts by weight of U.S.P. 99½% glycerine by heating to 170° F. with constant stirring.

(2) Cooling the product of step 1 to 80° F.

(3) Adding to the cooled product 75 parts by weight of U.S.P. propylene glycol; 3 parts by weight of glycerol mono-oleate; 3 parts by weight of lecithin; 0.2 part by weight of an antioxidant comprising 20% by weight of butylated hydroxyanisole, 6% by weight of propyl gallate, 4% by weight of citric acid and 70% by weight of propylene glycol; 0.5 part by weight of an extract of honey; 1.2 to 1.5 parts by weight of a coloring paste; and 1.2 to 1.5 parts by weight of a flavoring agent.

(4) Dry blending 100 parts by weight of a starch with 9 parts by weight of carrageenan.

(5) Adding the product of step 3 to the dry blended product of step 4 with enough shear to avoid agglomeration.

(6) Pouring the product of step 5 into a mold plate having an open face.

(7) Heating the mold plate to a temperature such that the product therein contained changed from a liquid to a solid appearing dry and grainy.

(8) Removing the solid product from the mold.

What is claimed is:

1. A method of producing a molded, edible product comprising the steps of:

providing a body of substantially anhydrous liquid selected from the group consisting of glycerine and a mixture of glycerine and propylene glycol;

adding to said body of liquid a mixture of carrageenan and a starch to form an initially liquid mixture, the amount of said carrageenan being sufficient to convert said liquid to a semi-fluid state on heating to a first predetermined temperature and the amount of said starch being sufficient to cause the attainment of a solidified state on further heating to a second, higher predetermined temperature;

filling a mold with the initially liquid mixture;

heating the filled mold until said liquid mixture passes through said semi-fluid state to said solidified state; and removing the resulting solid product from the mold.

2. A method as stated in claim 1 wherein the initially liquid mixture comprises:

2.5% by weight of carrageenan;
0.5% by weight of glycerol-monooleate;
0.4% by weight of sodium cyclamate;
0.4% by weight of potassium citrate;
22% by weight of tapioca starch; and
74.2% by weight of glycerol.

3. A method as stated in claim 1 wherein the mold contents are heated to a maximum temperature within the range of 195° F.–220° F.

4. A method as stated in claim 1 including the step of cooling the molded product to a temperature which will not burn the human hand before removing the solid product from the mold.

5. A method as stated in claim 1 wherein the mold is made of a material having intrinsic lubricity.

6. A method as stated in claim 1 wherein said liquid is glycerine.

7. A method as stated in claim 1 wherein said initially liquid mixture includes an internal mold release comprising glycerol-monooleate.

8. A method as stated in claim 1 including preparing the initially liquid mixture by the steps of:

dissolving 5 parts by weight of potassium citrate and 1 part by weight of an artificial sweetener comprising a 10 to 1 mixture of sodium cyclamate and sodium saccharin in 225 parts by weight of U.S.P. 99½% glycerine by heating to 170° F. with constant stirring;

cooling the stirred mixture to 80° F.;

adding to the resulting cooled mixture 75 parts by weight of U.S.P. propylene glycol; 3 parts by weight of glycerol mono-oleate; 3 parts by weight of lecithin; 0.2 part by weight of an antioxidant comprising 20% by weight of butylated hydroxy-anisole, 6% by weight of propyl gallate, 4% by weight of critic acid and 70% by weight of propylene glycol; 0.5 part by weight of an extract of honey; 1.2 to 1.5 parts by weight of a coloring paste; and 1.2 to 1.5 parts by weight of a flavoring agent;

dry blending 100 parts by weight of a starch with 9 parts by weight of carrageenan; and adding the cooled mixture to the dry blended product with enough shear to avoid agglomeration.

9. A method as stated in claim 1 including preparing the initially liquid mixture by the steps of:

adding an artificial sweetener and potassium citrate to glycerine to form a mixture;

heating said last-mentioned mixture to approximately 140° F. to dissolve the sweetener and the potassium citrate;

cooling the resulting mixture;

adding an internal mold release to the cooled mixture;

heating the mold-release-containing mixture to a temperature within the range of 90° F.–110° F.; and adding said carrageenan and said starch to the mold-release-containing mixture.

(References on following page)

References Cited

UNITED STATES PATENTS

| | | | |
|---|---|---|---|
| 2,015,097 | 9/1935 | Bowman et al. | |
| 2,726,960 | 12/1955 | Bolanowski | 99—139 XR |
| 2,771,156 | 11/1956 | Kasten et al. | |
| 2,864,706 | 12/1958 | Stoloff | 99—131 |
| 2,964,798 | 12/1960 | Ferrell. | |
| 2,970,919 | 2/1961 | Laurelton | 99—134 XR |

MAURICE W. GREENSTEIN, Primary Examiner

J. M. HUNTER, Assistant Examiner

U.S. Cl. X.R.

99—131, 138, 383